US012573157B2

(12) United States Patent
Cantero Clares et al.

(10) Patent No.: US 12,573,157 B2
(45) Date of Patent: Mar. 10, 2026

(54) SEE-THROUGH DISPLAY METHOD AND SEE-THROUGH DISPLAY SYSTEM

(71) Applicant: Acer Incorporated, New Taipei City (TW)

(72) Inventors: Sergio Cantero Clares, New Taipei City (TW); Shih-Hao Lin, New Taipei City (TW); Wen-Cheng Hsu, New Taipei City (TW); Chao-Kuang Yang, New Taipei City (TW)

(73) Assignee: Acer Incorporated, New Taipei City (TW)

( * ) Notice: Subject to any disclaimer, the term of this patent is extended or adjusted under 35 U.S.C. 154(b) by 197 days.

(21) Appl. No.: 18/636,244

(22) Filed: Apr. 15, 2024

(65) Prior Publication Data

US 2025/0322615 A1     Oct. 16, 2025

(51) Int. Cl.
| | |
|---|---|
| *G06T 19/00* | (2011.01) |
| *G06F 3/14* | (2006.01) |
| *H04N 13/282* | (2018.01) |
| *H04N 13/344* | (2018.01) |

(52) U.S. Cl.
CPC .............. *G06T 19/006* (2013.01); *G06F 3/14* (2013.01); *H04N 13/282* (2018.05); *H04N 13/344* (2018.05)

(58) Field of Classification Search
None
See application file for complete search history.

(56) References Cited

U.S. PATENT DOCUMENTS

| | | | |
|---|---|---|---|
| 2012/0122570 A1* | 5/2012 | Baronoff ............... | A63F 13/792 |
| | | | 463/31 |
| 2013/0113784 A1* | 5/2013 | White .................. | H04N 13/117 |
| | | | 345/419 |
| 2013/0120372 A1* | 5/2013 | Lee ........................ | G06T 19/006 |
| | | | 345/419 |
| 2015/0161814 A1* | 6/2015 | Engh-Halstvedt ...... | G06T 15/30 |
| | | | 345/420 |
| 2018/0350281 A1* | 12/2018 | Hur .......................... | G06T 5/80 |

FOREIGN PATENT DOCUMENTS

| | | |
|---|---|---|
| TW | 201621549 | 6/2016 |
| TW | 202125401 | 7/2021 |

* cited by examiner

*Primary Examiner* — Tapas Mazumder
(74) *Attorney, Agent, or Firm* — JCIPRNET

(57) ABSTRACT

A see-through display method and a see-through display system are disclosed. The method includes the following steps. A user image is captured toward the front side of a display through a first image sensor, and a scene image is captured toward the rear side of the display through a second image sensor. User position information associated with the three-dimensional reference coordinate system is obtained according to the user image. Scene position information associated with the three-dimensional reference coordinate system is obtained according to the scene image. A viewing frustum is determined based on the user position information and a physical size of the display. A projection matrix of the viewing frustum is used to generate a display frame projected on the display plane of the display according to the scene position information. The display frame is output through the display to show the scene behind the display.

20 Claims, 8 Drawing Sheets

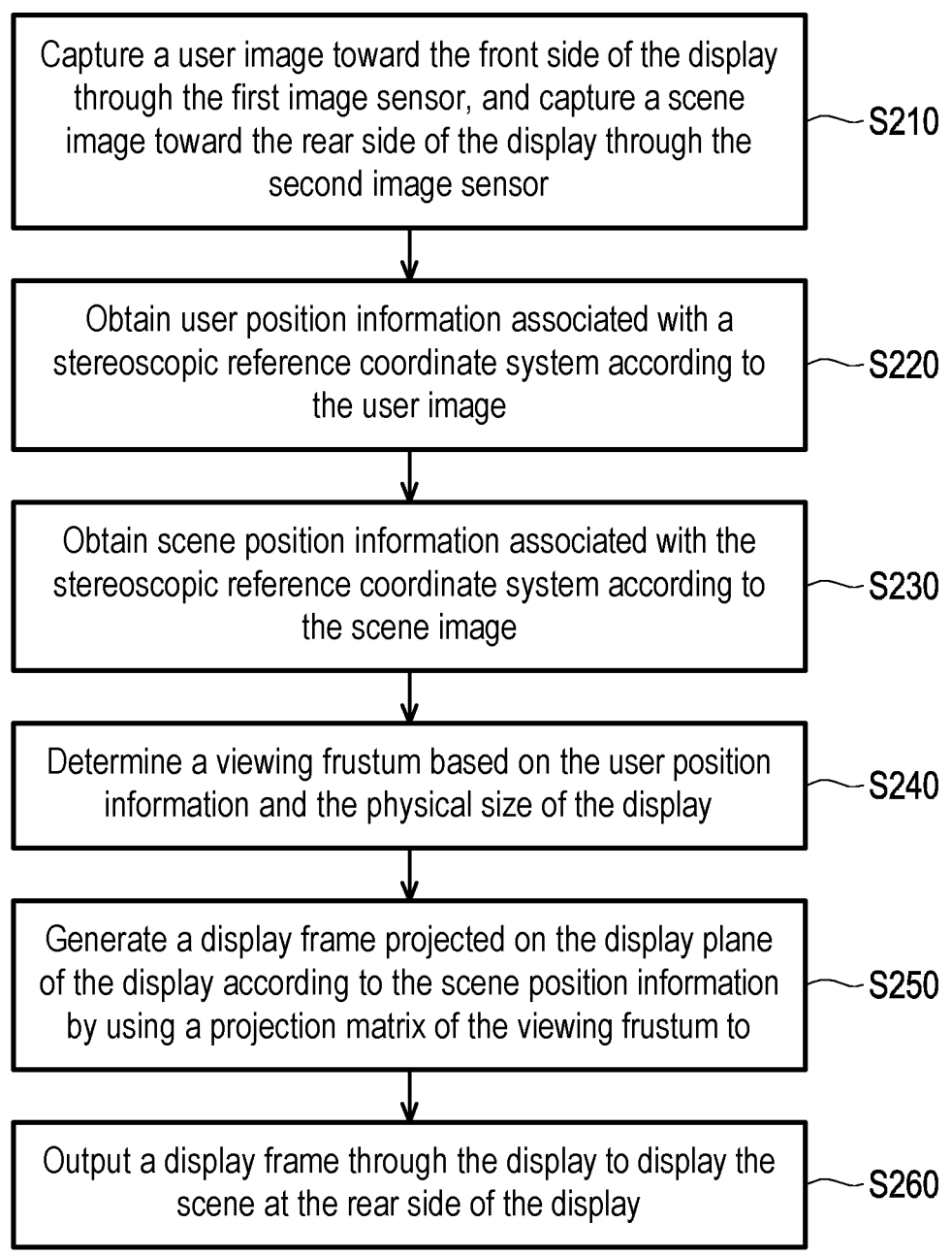

Capture a user image toward the front side of the display through the first image sensor, and capture a scene image toward the rear side of the display through the second image sensor —— S210

Obtain user position information associated with a stereoscopic reference coordinate system according to the user image —— S220

Obtain scene position information associated with the stereoscopic reference coordinate system according to the scene image —— S230

Determine a viewing frustum based on the user position information and the physical size of the display —— S240

Generate a display frame projected on the display plane of the display according to the scene position information by using a projection matrix of the viewing frustum to —— S250

Output a display frame through the display to display the scene at the rear side of the display —— S260

FIG. 2

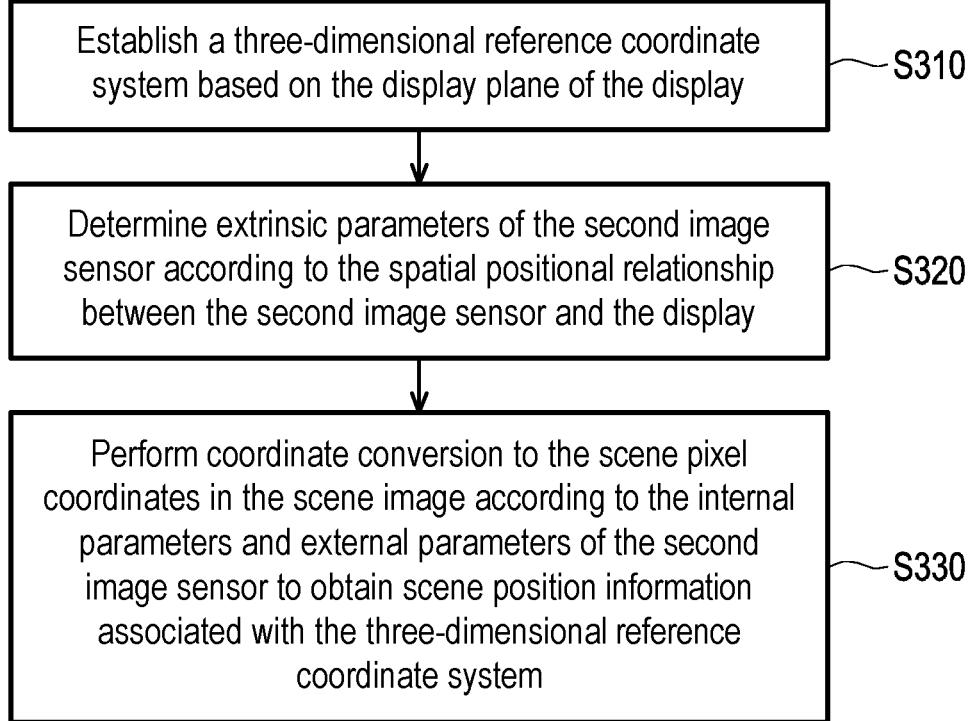

Establish a three-dimensional reference coordinate system based on the display plane of the display —~S310

Determine extrinsic parameters of the second image sensor according to the spatial positional relationship between the second image sensor and the display —~S320

Perform coordinate conversion to the scene pixel coordinates in the scene image according to the internal parameters and external parameters of the second image sensor to obtain scene position information associated with the three-dimensional reference coordinate system —~S330

SEE-THROUGH DISPLAY METHOD AND SEE-THROUGH DISPLAY SYSTEM

BACKGROUND

Technical Field

The disclosure relates to an image display technology, and in particular to a see-through display method and a see-through display system.

Description of Related Art

With the advancement of technology, augmented reality (AR) applications have become more and more popular. This technology not only makes breakthroughs in the entertainment field, but is also widely used in business, education, medical and other fields. As AR technology continues to mature and become more popular, people may integrate virtual elements into the real world through AR glasses, smartphones, various handheld electronic devices or various wearable electronic devices, providing users with a rich interactive experience. In general, AR technology will continue to change the lifestyle of modern people and bring them more convenience and rich experiences.

Generally speaking, a camera installed on the rear side of a handheld electronic device may capture a real scene, and the AR picture displayed by the handheld electronic device includes a real scene image and virtual elements superimposed on the real scene image. Traditionally, due to the mobility of handheld electronic devices and the insignificant change in relative position to the user, it is unnecessary to generate AR images based on user tracking results. However, when trying to apply AR technology to a large display located in a fixed position, if the relative positional relationship between the user and the display is not considered, the scene content in the AR image will not meet the user's needs. For example, the user may not be able to view scene objects of interest through the displayed AR image of the display.

SUMMARY

The disclosure provides a see-through display method and a see-through display system that may effectively solve the above problems.

Exemplary embodiments of the invention provide a see-through display method, which is adapted to a see-through display system including a first image sensor, a second image sensor and a display. The see-through display method includes the following steps. A user image is captured toward the front side of the display through the first image sensor, and a scene image is captured toward the rear side of the display through the second image sensor. User position information associated with a three-dimensional reference coordinate system is obtained according to the user image. Scene position information associated with the three-dimensional reference coordinate system is obtained according to the scene image. A viewing frustum is determined based on the user position information and a physical size of the display. A display frame projected on the display plane of the display is generated based on the scene position information by using the projection matrix of the viewing frustum. A display frame is outputted through the display to display the scene at the rear side of the display.

Another exemplary embodiment of the invention provides a see-through display system. The see-through display system includes a first image sensor, a second image sensor, a display, and at least one processor. The processor is coupled to the first image sensor, the second image sensor and the display, and is configured to perform the following operations. A user image is captured toward the front side of the display through the first image sensor, and a scene image is captured toward the rear side of the display through the second image sensor. User position information associated with a three-dimensional reference coordinate system is obtained according to the user image. Scene position information associated with the three-dimensional reference coordinate system is obtained according to the scene image. A viewing frustum is determined based on the user position information and a physical size of the display. A display frame projected on the display plane of the display is generated based on the scene position information by using the projection matrix of the viewing frustum. A display frame is outputted through the display to display the scene at the rear side of the display.

Based on the above, in embodiments of the disclosure, user position information and scene position information in the same three-dimensional reference coordinate system may be obtained based on the user image and the scene image. The viewing frustum utilized to determine the display content of the display frame may be based on user position information and the physical size of the display. Therefore, the display scene content in the display frame output by the display may change in response to the user's movement, and may be well aligned with the actual scene around the display.

BRIEF DESCRIPTION OF THE DRAWINGS

FIG. 2 is a flowchart of a see-through display method according to an embodiment of the invention.

FIG. 3 is a flowchart for obtaining scene position information according to an embodiment of the invention.

DESCRIPTION OF THE EMBODIMENTS

Some exemplary embodiments of the present disclosure will be described in detail below with reference to the accompanying drawings. The component symbols cited in the following description will be regarded as the same or similar components when the same component symbols appear in different drawings. These exemplary embodiments are only part of the disclosure and do not disclose all possible implementations of the disclosure. Rather, these example embodiments are merely examples of methods and systems within the scope of the present disclosure.

Figure 1A:
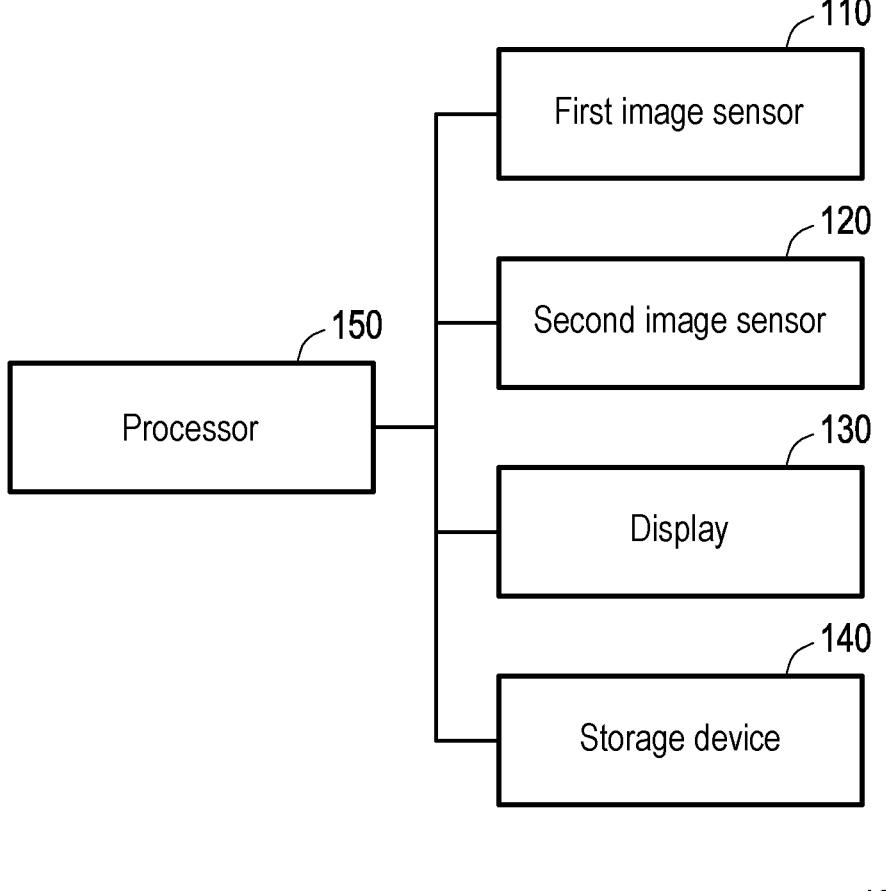
FIG. 1A to FIG. 1C are schematic diagrams of a see-through display system according to an embodiment of the invention.
Figure 1B:
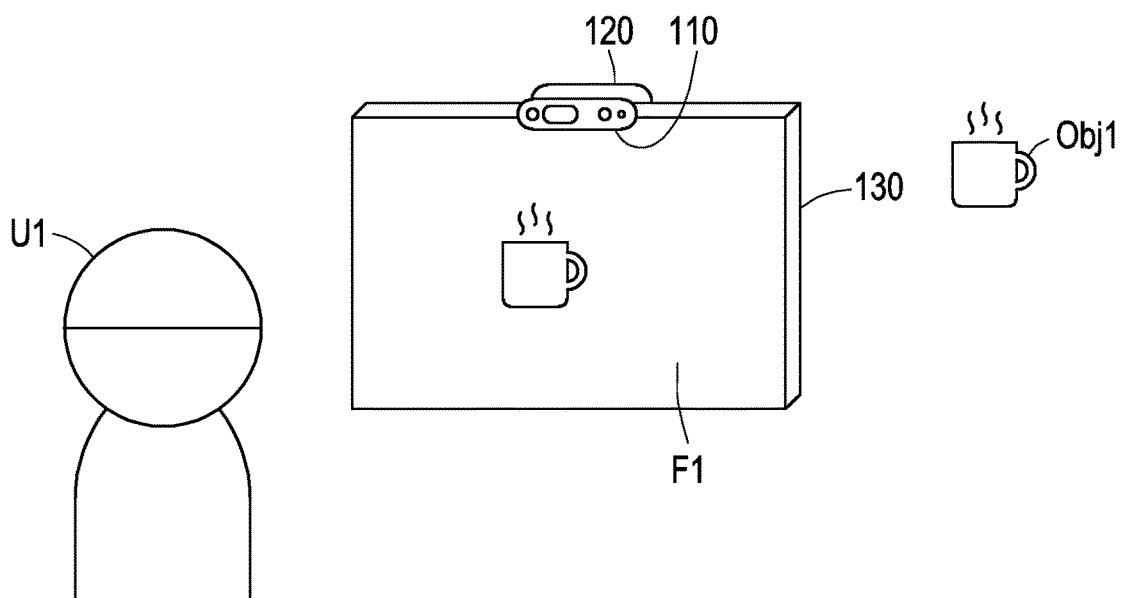
Figure 1C:
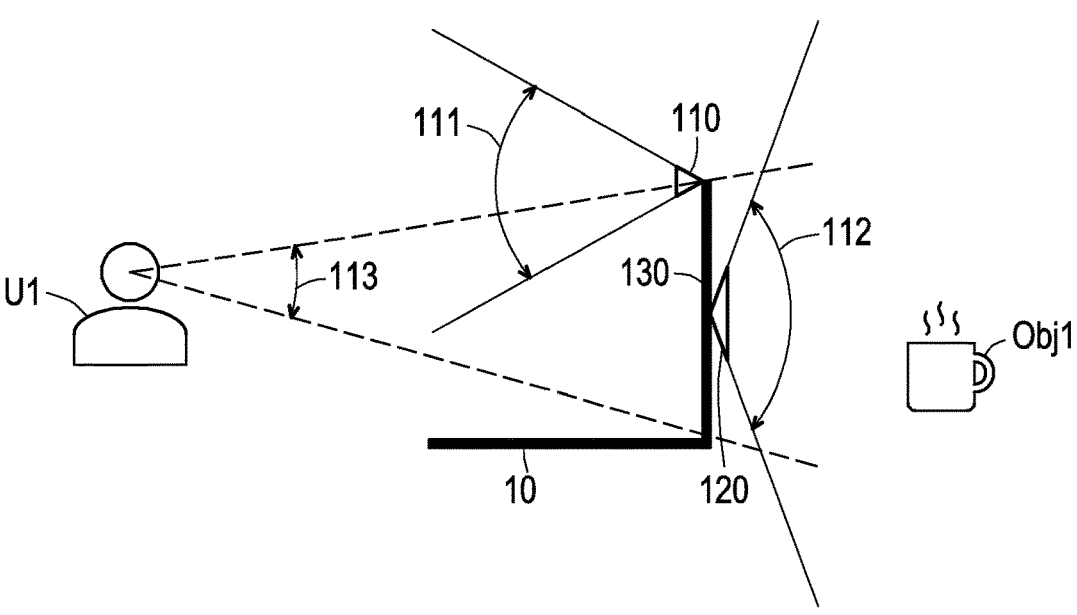

FIG. 1A to FIG. 1C are schematic diagrams of a see-through display system according to an embodiment of the invention.

With reference to FIG. 1A, in some embodiments, the see-through display system 10 may be implemented in, for example, the following electronic devices with image processing capabilities and data computing capabilities: notebook computers, tablet computers, personal computers, servers, game consoles, portable electronic devices, desktop computers or other electronic devices. The see-through display system 10 includes a first image sensor 110, a second image sensor 120, a display 130, a storage device 140, and at least one processor 150.

The processor 150 is responsible for all or part of the operation of the see-through display system 10. For example, the processor 150 may include a central processing unit (CPU), a graphics processing unit (GPU), or other programmable general or special-purpose microprocessor, digital signal processor (digital signal processor), DSP, programmable controller, application specific integrated circuit (ASIC), programmable logic device (PLD) or other similar devices or a combination of these devices. The number of processors 150 may be one or more, and the invention does not limit this.

The storage device 140 is connected to the processor 150 and is used to temporarily or permanently store data, such as images, instructions, program codes, software modules, etc. Specifically, storage device 140 may include volatile storage circuitry. Volatile storage circuits are used to store data in a volatile manner. For example, the volatile storage circuit may include random access memory (RAM) or similar volatile storage media. Alternatively, storage device 140 may include non-volatile storage circuitry. Non-volatile storage circuits are used to store data in a non-volatile manner. For example, the non-volatile storage circuit may include read only memory (ROM), solid state drive (SSD) and/or traditional hard disk drive (HDD) or similar Non-volatile storage media. The number of storage devices 140 may be one or more, and the invention does not limit this.

The display 130 may be, for example, a liquid crystal display (LCD), a light-emitting diode (LED) display, an organic light-emitting diode (OLED) display, or other types of displays. The invention is not limited in this regard. In some embodiments, the display 130 may be a stereoscopic display that provides different images to the user's left eye or right eye respectively to present a stereoscopic visual effect, but the invention is not limited thereto. For example, the display 130 may be a naked-eye 3D display or a glasses-type 3D display.

The first image sensor 110 is configured to capture images and includes a camera lens having a lens and a photosensitive element. The first image sensor 110 may, for example, be implemented as a camera module including the lens, the photosensitive element and other components. The photosensitive element may be, for example, a Charge Coupled Device (CCD), a Complementary Metal-Oxide Semiconductor (CMOS) element or other elements, and the invention is not limited thereto. From another perspective, the first image sensor 110 may be an RGB image sensor.

The second image sensor 120 is configured to capture images and includes a camera lens having a lens and a photosensitive element. The first image sensor 120 may, for example, be implemented as a camera module including a lens, a photosensitive element and other components. The photosensitive element is, for example, a charge-coupled element, a complementary metal oxide semiconductor element or other elements, and the invention is not limited thereto. From another perspective, the second image sensor 120 may be an RGB image sensor.

With reference to FIG. 1B, in some embodiments, the user U1 is located on the front side of the display 110, and the first image sensor 110 is used to capture the user image toward the front side of the display 130. According to the eye tracking technology or face tracking technology well known to those skilled in the art, this user image may be used to track the eye position information or face position information of the user U1, etc. The second image sensor 120 is used to capture scene images toward the rear side of the display 130. Based on this, the processor 150 may obtain the user position information of the user U1 based on the user image captured by the first image sensor 110, and the processor 150 may obtain the scene position information based on the scene image captured by the second image sensor 120, such as the spatial position information of the scene object Obj1.

In some embodiments of the invention, the processor 150 may determine the display frame F1 according to the user position information of the user U1. The display frame F1 is configured to display the scene at the rear side of the display 130, and the display scene of the display frame F1 may be substantially aligned with the actual scene around the display 130. As shown in FIG. 1B, although the user U1 may not directly see the scene object Obj1 blocked by the display 130, the display frame F1 may include the image of the scene object Obj1 to achieve the see-through display function. It should be noted that, when the user U1 moves, the content of the scene blocked by the display 130 also changes accordingly. The display scene of the displayed picture frame F1 may also change in response to the movement of the user U1, so that the displayed scene of the displayed frame F1 may remain substantially aligned with the surrounding actual scene.

With reference to FIG. 1C, in some embodiments, the see-through display system 10 may be a notebook computer. The first image sensor 110 may be a front camera module disposed above the display plane of the display 130, and the second image sensor 110 may be a rear camera module disposed on the upper cover of the notebook computer. When the user U1 operates the laptop, the display 130 of the laptop may display the scene content blocked by the laptop according to the current location of the user U1.

In some embodiments, the Field of View (FOV) 111 of the first image sensor 110 is smaller than the FOV 112 of the second image sensor 120 to ensure that the second image sensor 120 captures enough scene content. In some embodiments, the lens of the second image sensor 120 may be implemented by a fisheye lens or a wide-angle lens with a large FOV.

In addition, in some embodiments, the scene range displayed by the display 130 may be determined based on the user position information of the user U1 and the physical size of the display 130. Furthermore, under the condition that the user U1 is regarded as a virtual camera, the processor 150 may determine the FOV 113 and viewing frustum of the virtual camera based on the user position information of the user U1 and the physical size of the display 130.

FIG. 2 is a flowchart of a see-through display method according to an embodiment of the invention, and the method flow of FIG. 2 may be implemented by the see-through display system 10 of FIG. 1A. Here, the user may view the scene content at the rear side of the display 130 through the display 130 of the see-through display system 10.

In step S210, the processor 150 captures the user image toward the front side of the display 130 through the first image sensor 110, and captures the scene image toward the rear side of the display 130 through the second image sensor 120. Specifically, the first image sensor 110 is used to photograph the user viewing the display 130, and the second image sensor 120 is used to photograph the actual scene behind the display 130.

In step S220, the processor 150 obtains user position information associated with the three-dimensional reference coordinate system according to the user image. It should be noted that, the three-dimensional reference coordinate system is defined based on the display plane of the display 130. In some embodiments, the user position information may include distance information between the user and the display 130. The processor 150 may estimate the distance information between the user and the display 130 based on the face size, interpupillary distance or other facial features in the user image. Alternatively, in other embodiments, the user position information may include three-dimensional user coordinates of the user in a three-dimensional coordinate system. The processor 150 may convert the user image coordinates in the user image into world coordinates in a world coordinate system (such as a three-dimensional system based on the display 130) according to the intrinsic parameters and extrinsic parameters of the first image sensor 110.

In some embodiments, the first coordinate axis and the second coordinate axis of the three-dimensional reference coordinate system are parallel to the display plane of the display 130, and the origin of the three-dimensional reference coordinate system is a reference point on the display plane. For example, the origin of the three-dimensional reference coordinate system may be the center point on the display plane. The X-axis and Y-axis of the three-dimensional reference coordinate system are located on the display plane. That is, the display plane is the plane with Z=0 in the three-dimensional reference coordinate system.

In some embodiments, the first image sensor 110 may also be used with at least one depth sensor (not shown) or a distance sensor (not shown) to implement image recognition and image positioning to the user, so as to obtain the three-dimensional user coordinates in a three-dimensional reference coordinate system.

In step S230, the processor 150 obtains scene position information associated with the three-dimensional reference coordinate system according to the scene image. In some embodiments, the scene position information may include the three-dimensional scene coordinates in a three-dimensional coordinate system. The processor 150 may convert the image coordinates in the scene image into the world coordinates in a world coordinate system (such as a three-dimensional reference coordinate system established based on the display 130) according to the intrinsic parameters and extrinsic parameters of the second image sensor 120. In some embodiments, the image coordinates for coordinate transformation in the scene image may be sampled from the grid nodes of the three-dimensional grid.

In some embodiments, FIG. 3 is a flowchart for obtaining scene position information according to an embodiment of the invention. Referring to FIG. 3, in step S310, the processor 150 establishes a three-dimensional reference coordinate system based on the display plane of the display 130.

Figure 4:
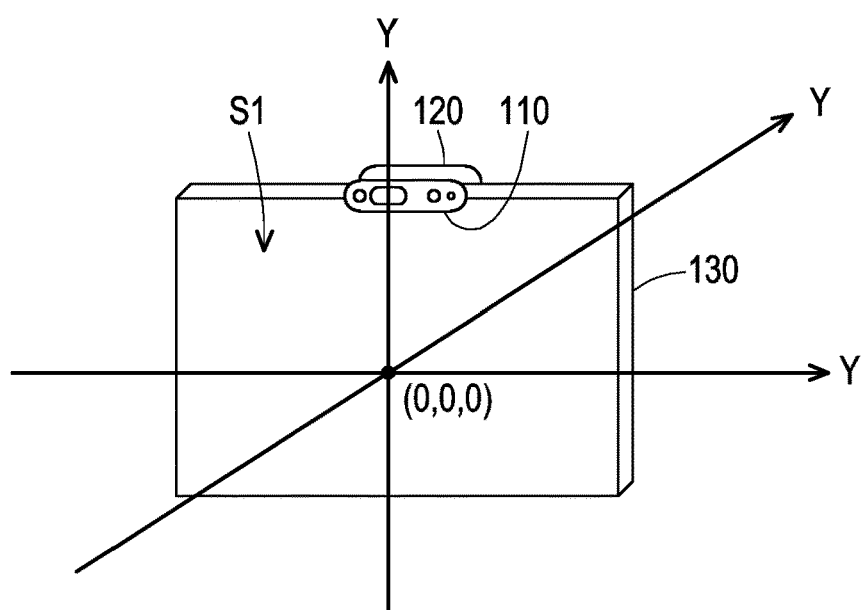
FIG. 4 is a schematic diagram of a three-dimensional reference coordinate system according to an embodiment of the invention.

For example, FIG. 4 is a schematic diagram of a three-dimensional reference coordinate system according to an embodiment of the invention. Referring to FIG. 4, the processor 150 may set the origin (0, 0, 0) of the three-dimensional reference coordinate system as the center point on the display plane S1. The X-axis of the three-dimensional reference coordinate system is the display horizontal axis of the display 130, and the Y-axis of the three-dimensional reference coordinate system is the display vertical axis of the display 130. The Z-axis of the three-dimensional reference coordinate system passes through the origin (0, 0, 0) and is perpendicular to the display plane S1.

In step S320, the processor 150 determines extrinsic parameters of the second image sensor 120 according to the spatial positional relationship between the second image sensor 120 and the display 130. The extrinsic parameters of the second image sensor 120 describe the position and the sensing direction of the second image sensor 120, and the conversion relationship between the second image sensor 120 and the world coordinate system. These extrinsic parameters are usually used to define the position and orientation of the second image sensor 120 in order to map points in the camera coordinate system to the world coordinate system, or to map points in the world coordinate system into the camera coordinate system.

In some embodiments, the processor 150 may define a three-dimensional reference coordinate system based on the display plane of the display 130 and use this three-dimensional reference coordinate system as the world coordinate system. Under this condition, based on the spatial positional relationship between the second image sensor 120 and the display 130, the processor 150 may obtain the coordinate position of the second image sensor 120 in the three-dimensional reference coordinate system. In addition, other extrinsic parameters of the second image sensor 120, such as the shooting orientation, etc., may be obtained through the camera calibration process.

In step S330, the processor 150 performs coordinate conversion to the scene pixel coordinates in the scene image according to the internal parameters and extrinsic parameters of the second image sensor 120 to obtain scene position information associated with the three-dimensional reference coordinate system. Specifically, the processor 150 may perform coordinate conversion based on the following formula (1) to convert scene pixel coordinates in the scene image into 3D scene coordinates in the three-dimensional reference coordinate system. In some embodiments, the processor 150 may convert the image coordinates of the grid nodes of the grid of the scene image into 3D scene coordinates.

$$s \begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \\ 1 \end{bmatrix} = K[R \mid T] \begin{bmatrix} X \\ Y \\ Z \\ 1 \end{bmatrix} \quad (1)$$

Wherein, (u, v) represents the image coordinates, (X, Y, Z) represents the world coordinates, $$\begin{bmatrix} f_x & 0 & c_x \\ 0 & f_y & c_y \\ 0 & 0 & 1 \end{bmatrix}$$

is the internal parameter matrix of the second image sensor 120, and $$\begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} = [R \,|\, T]$$

is the extrinsic parameter matrix of the second image sensor 120. The extrinsic parameter matrix includes the rotation matrix R and the translation vector T. The extrinsic parameter matrix of the second image sensor 120 may be used to represent the position and shooting direction of the second image sensor 120 in the world coordinate system (i.e., the three-dimensional reference coordinate system). In this way, the processor 150 may convert multiple image coordinates in the scene image into 3D scene coordinates in the three-dimensional reference coordinate system through coordinate conversion.

In some embodiments, the second image sensor 120 may include a fisheye lens or a wide-angle lens, and the fisheye lens or wide-angle lens is used to capture scene images. Before obtaining the scene position information associated with the three-dimensional reference coordinate system through coordinate conversion, the processor 150 may perform a deformation correction process on the scene image. In other words, the processor 150 may calibrate image distortion for fisheye images or wide-angle images. Specifically, when the second image sensor 120 captures the scene image through the wide-angle lens, the processor 150 may perform deformation correction processing through formula (2). When the second image sensor 120 captures the scene image through the fisheye lens, the processor 150 may perform deformation correction processing through formula (3).

$$\begin{pmatrix} x_d \\ y_d \end{pmatrix} = \left[ 1 + k_1 r^2 + k_2 r^4 + k_3 r^6 \right] \begin{pmatrix} x_n \\ y_n \end{pmatrix} + \begin{pmatrix} 2 p_1 x_n y_n + p_2 (r^2 + 2 x_n^2) \\ p_1 (r^2 + 2 y^2) + 2 p_2 x_n y_n \end{pmatrix} \quad (2)$$

$$\begin{pmatrix} x_d \\ y_d \end{pmatrix} = \frac{\theta}{r} \left[ 1 + k_1 \theta^2 + k_2 \theta^4 + k_3 \theta^6 + k_4 \theta^8 \right] \begin{pmatrix} x_n \\ y_n \end{pmatrix} \quad (3)$$

Wherein, $$r = \sqrt{x_n^2 + y_n^2}, \; \theta = \tan^{-1} r,$$

an aid the radial distortion coefficients, and $p_n$ is the tangential distortion coefficients, and $$\begin{pmatrix} x_d \\ y_d \end{pmatrix}$$

is the calibrated image pixel.

Returning to FIG. 2, in step S240, the processor 150 determines a viewing frustum based on the user position information and the physical size of the display. The view frustum is a geometry used to represent the visible area of the camera, which may also be called the projection view frustum. The viewing frustum consists of six planes, namely the near plane, the far plane, the left plane, the right plane, the top plane and the bottom plane. These planes define the area that the camera may see. In other words, this view frustum may be used to determine how to capture a partial scene image from the scene image.

In an embodiment of the invention, the processor 150 may set the user coordinates of the user in the three-dimensional reference coordinate system as the coordinate position of the virtual camera, and determine the viewing frustum based on the user coordinates. In some embodiments, the viewing frustum changes in response to changes in user position information. That is, when the user moves, the viewing frustum will also change accordingly.

Figure 5:
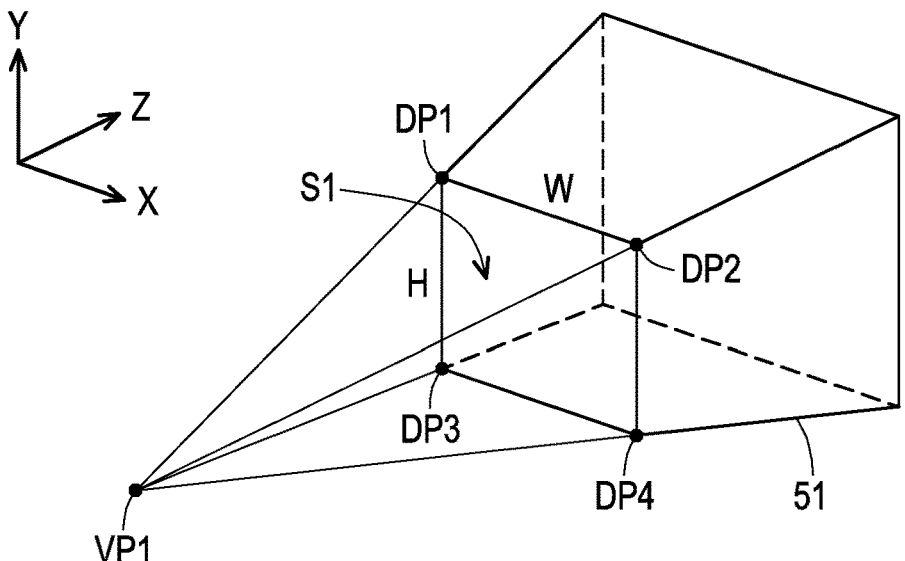
FIG. 5 is a schematic diagram of determining a viewing frustum based on user position information according to an embodiment of the invention.

In some embodiments, the user position information may include a user coordinate associated with a three-dimensional reference coordinate system, and the viewing frustum is obtained by connecting the user coordinates to a plurality of vertices of the display plane of the display 130. That is to say, the left plane, right plane, top plane and bottom plane of the viewing frustum are determined according to the display range of the display 130. For example, FIG. 5 is a schematic diagram of determining a viewing frustum based on user position information according to an embodiment of the invention. Referring to FIG. 5, the display plane S1 of the display 130 includes vertices DP1, DP2, DP3, and DP4. After acquiring the user coordinates VP1 in the three-dimensional reference coordinate system based on the user's shadow, the processor 150 may connect the user coordinates VP1 with multiple vertices DP1, DP2, DP3, and DP4 of the display plane S1 to obtain the viewing frustum 51. The processor 150 may set the far plane and the near plane of the viewing frustum 51 according to the preset distance. It may be seen that, the aspect ratio of the viewport is the aspect ratio of the display 130.

After determining the viewing frustum according to the physical size of the display 130 and the user coordinates, the processor 150 may derive the parameters of the projection matrix. Specifically, each plane of the view frustum defines the parameters in the projection matrix, such as the viewing angle, viewport aspect ratio, near plane and far plane distance, etc. These parameters determine the numerical elements of the projection matrix. In some embodiments, the projection matrix may be an off-center perspective matrix. For example, the projection matrix P obtained by the processor 150 may be represented by formula (5).

$$P = \begin{bmatrix} \dfrac{2 \, near}{right - left} & 0 & 0 & \dfrac{-near \, (right + left)}{right - left} \\ 0 & \dfrac{2 \, near}{top - bottom} & 0 & \dfrac{-near \, (top + bottom)}{top - bottom} \\ 0 & 0 & \dfrac{-(far + near)}{far - near} & \dfrac{2 \, far * near}{near - far} \\ 0 & 0 & -1 & 0 \end{bmatrix} \quad (5)$$

Wherein, near represents the distance between the near plane and the user coordinates, far represents the distance between the far plane and the user coordinates, right represents the X coordinate of the right display boundary of the display 130, and left represents the left display of the display 130 The X coordinate of the boundary. top represents the Y coordinate of the upper display border of the display 130, and bottom represents the Y coordinate of the lower display border of the display 130.

In step S250, the processor 150 generates a display frame projected on the display plane of the display 130 according to the scene position information by using the projection matrix of the viewing frustum. Specifically, the processor 150 may multiply the four-dimensional homogeneous coordinates (x, y, z, 1) of the multiple three-dimensional scene coordinates in the three-dimensional reference coordinate system by the projection matrix P to map these scene coordinates to the corresponding screen coordinates on the viewport (i.e., the display plane). The above-mentioned scene coordinates may be three-dimensional coordinates of multiple grid nodes in a three-dimensional reference coordinate system. In other words, the partial scene image in the scene image may be projected to the display plane through the projection matrix to generate a display frame.

In step S260, the processor 150 outputs a display frame through the display 130 to display the scene behind the display 130. Specifically, since the projection range of the scene image projected onto the display plane of the display 130 is determined based on the user position information and the physical size of the display 130, not only the display frame output by the display 130 may present the scene behind the display 130, but also and the scene content in the display frame may be aligned with the real scene around the display 130. In addition, in response to the movement of the user, the scene content of the display frame on the display 130 will also change accordingly.

Figure 6A:
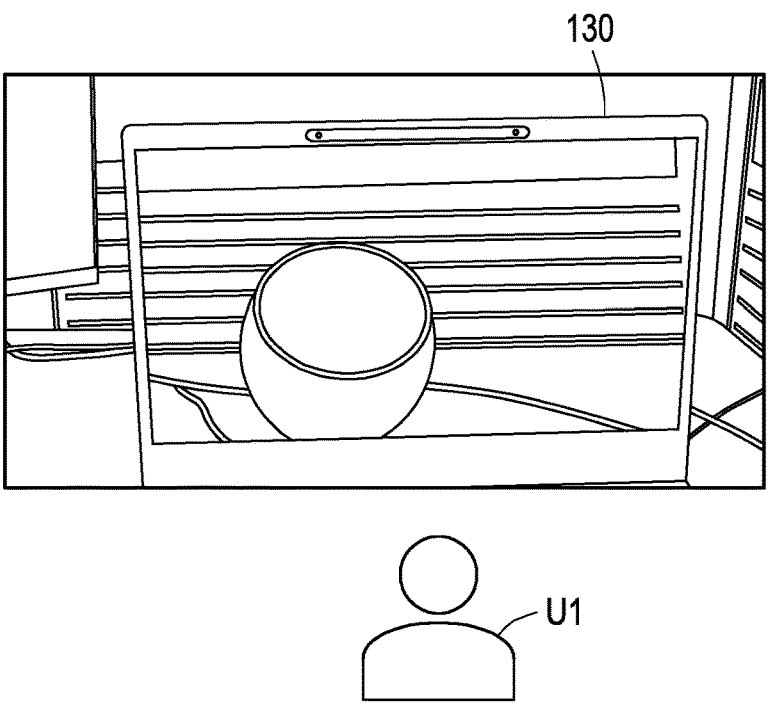
FIG. 6A and FIG. 6B are schematic diagrams of display scenes according to embodiments of the invention.
Figure 6B:
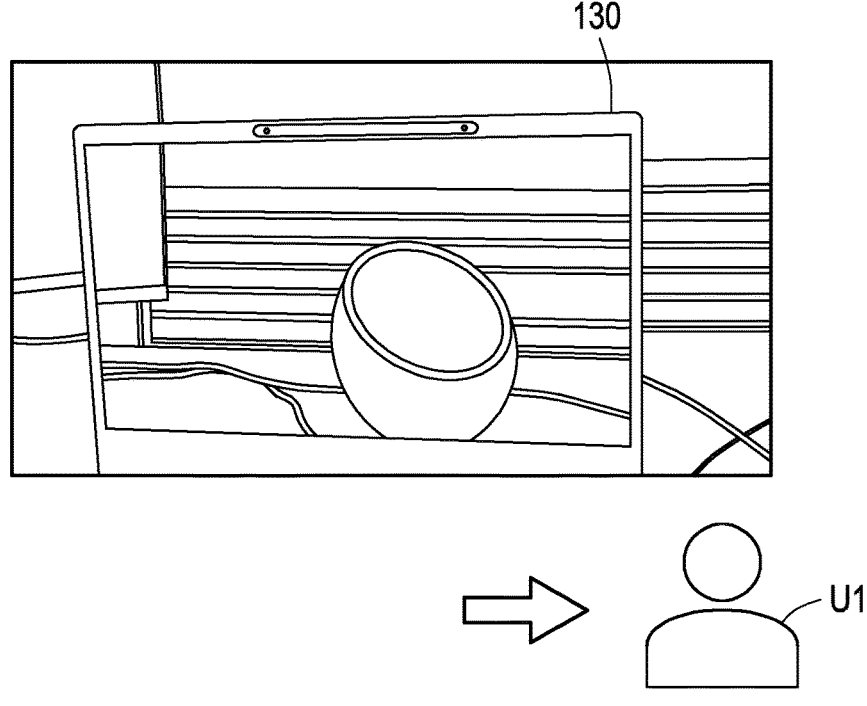

For example, FIG. 6A and FIG. 6B are schematic diagrams of display scenes according to embodiments of the invention. Referring to 6A, when the user U1 is located at the first position, the display frame of the display 130 may include scene content at the rear side of the display 130. For example, a container obscured by the display 130 will be displayed on the display 130. Referring to 6B, when the user moves from the first position to the second position, the view frustum determined based on the user's position will change accordingly. Therefore, the scene content captured by the viewing frustum will also change, so that the scene content displayed on the display 130 will be adjusted accordingly. In some embodiments, the processor 150 may also use the above-mentioned display frame as the background of the AR picture to provide an AR function or AR application.

Figure 7:
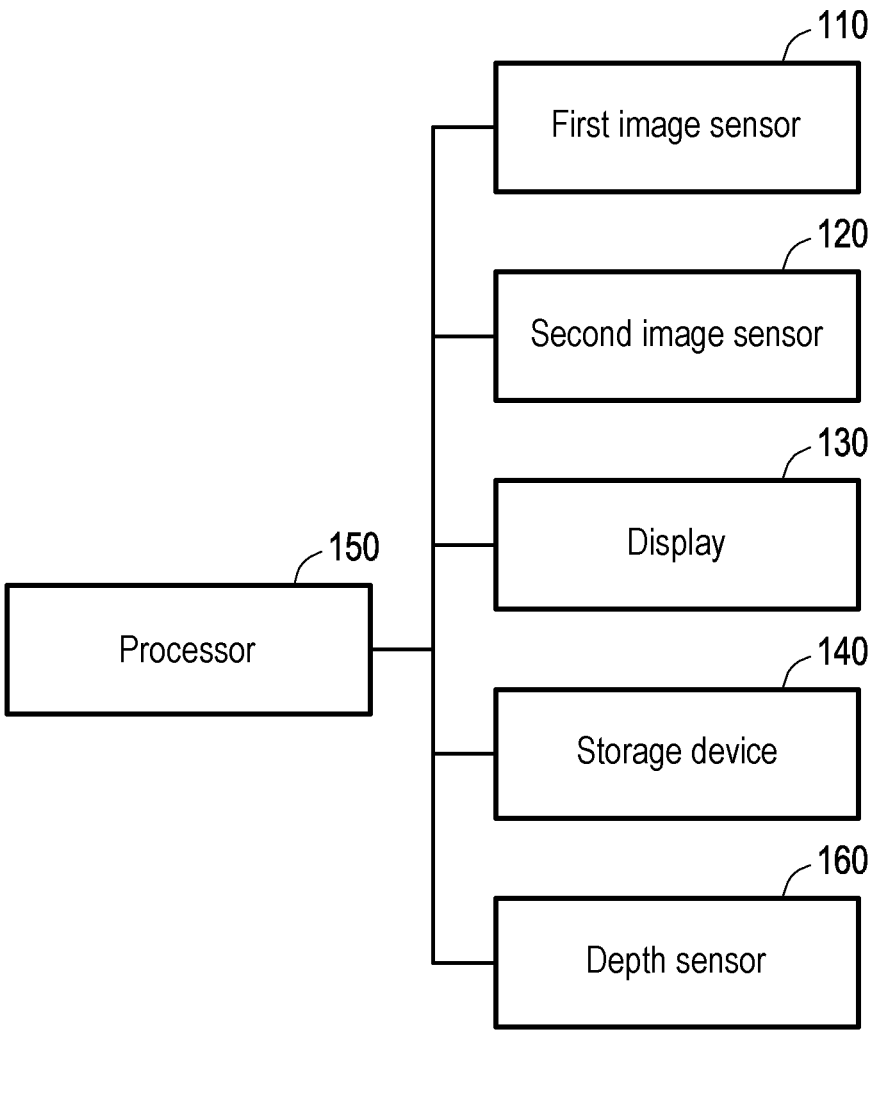
FIG. 7 is a schematic diagram of a see-through display system according to an embodiment of the invention.

FIG. 7 is a schematic diagram of a see-through display system according to an embodiment of the invention. Referring to FIG. 7, the see-through display system 70 may include a first image sensor 110, a second image sensor 120, a display 130, a storage device 140, at least one processor 150, and a depth sensor 160. Different from the embodiment of FIG. 1, the see-through display system 70 may also include a depth sensor 160 for sensing depth information of the scene. The depth sensor 160 may be implemented using active depth sensing technology and passive depth sensing technology. Active depth sensing technology may calculate depth information by actively emitting light sources, infrared, ultrasound, laser, etc. as signals together with time-lag ranging technology. Passive depth sensing technology may use two image sensors to capture two images in front of them from different viewing angles to calculate depth information using the parallax of the two images.

Figure 8:
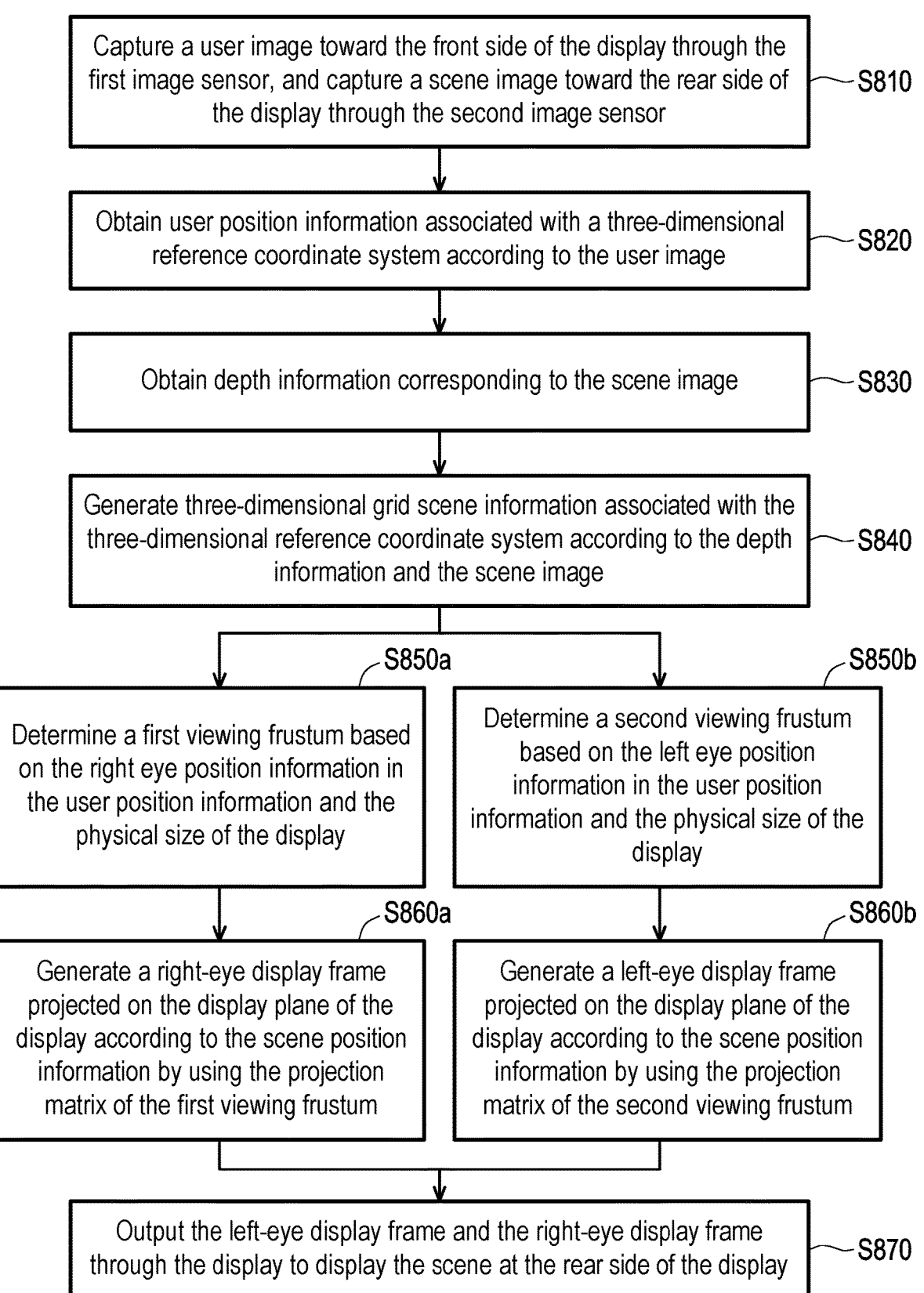
FIG. 8 is a flowchart of a see-through display method according to an embodiment of the invention.

FIG. 8 is a flowchart of a see-through display method according to an embodiment of the invention, and the method flow of FIG. 8 may be implemented by the see-through display system 70 of FIG. 7. Here, the user may view the scene content at the rear side of the display 130 through the display 130 of the see-through display system 70.

In one embodiment, the scene position information of the scene image includes three-dimensional grid scene information associated with the three-dimensional reference coordinate system. The Z coordinate value of the grid node in the three-dimensional reference coordinate system in the three-dimensional grid scene information may be generated based on the scene depth.

In step S810, the processor 150 captures the user image toward the front side of the display 130 through the first image sensor 110, and captures the scene image toward the rear side of the display 130 through the second image sensor 120. In step S820, the processor 150 obtains user position information associated with the three-dimensional reference coordinate system according to the user image. For these steps, reference may be made to the descriptions of the foregoing embodiments and will not be described again here.

In step S830, the processor 150 obtains depth information corresponding to the scene image. For example, the value of each pixel (or position) in the depth map may indicate the depth value of the corresponding pixel (or position) in the scene image. The processor 11 may use the depth map as depth information corresponding to the scene image.

In some embodiments, the processor 150 may utilize the depth sensor 160 to obtain depth information corresponding to the scene image. Alternatively, in other embodiments, the processor 150 may perform an image preprocessing operation on the scene image to generate an adjusted scene image that meets the input requirements of the deep learning model. The processor 150 may analyze the adjusted scene image to obtain depth information through a deep learning model.

In some embodiments, the storage device 140 may store deep learning models. Deep learning models are implemented based on neural network structures such as convolutional neural networks (CNN) or neural network-like networks. Deep learning models are used to estimate (i.e., predict) the depth of each pixel (or location) in a scene image. In addition, the processor 150 may perform image preprocessing operations on the scene image to generate an adjusted scene image that meets the input requirements of the deep learning model. For example, in the image preprocessing operation, the processor 150 may adjust the size of the scene image and/or convert the format of the scene image to generate an adjusted scene image. The processor 150 analyzes the adjusted scene image through a deep learning model to obtain depth information corresponding to the first image. For example, the processor 150 may input the adjusted scene image to a deep learning model and then receive an output depth map from the deep learning model regarding the adjusted scene image.

In some embodiments, the processor 150 may determine whether the depth sensor 160 for sensing scene depth information is available, or determine whether a deep learning model for estimating scene depth information is available. When the depth sensor 160 is available or the deep learning model is available, the processor 150 may obtain depth information of the scene image.

When at least one of the depth sensor 160 and the deep learning model is available, in step S840, the processor 150 generates three-dimensional grid scene information associated with the three-dimensional reference coordinate system according to the depth information and the scene image. In one embodiment, the height of the grid node of the three-dimensional grid in the Z-axis direction of the three-dimensional reference coordinate system may be regarded as the depth of the three-dimensional grid node. Otherwise, when neither the depth sensor 160 nor the deep learning model is available, the processor 150 may generate grid information of a plane with the same height in the Z-axis direction.

In step S850*a*, the processor 150 determines the first viewing frustum based on the right eye position information in the user position information and the physical size of the display 130. In step S850*b*, the processor 150 determines the second viewing frustum based on the left eye position information in the user position information and the physical size of the display. The detailed operation of the processor 150 to determine the viewing frustum may refer to the description of the foregoing embodiments. It should be noted that, in some embodiments, the processor 150 may respectively determine the right eye position information of the user's right eye and the left eye position information of the left eye according to the user image. The right eye position information and the left eye position information may be left eye coordinates and right eye coordinates in the three-dimensional reference coordinate system respectively. Therefore, the processor 150 may determine the first viewing frustum and the second viewing frustum according to the left eye coordinates, the right eye coordinates and the physical size of the display 130 respectively. It may be seen that since the coordinates of the right eye are different from the coordinates of the left eye, the content of the scene captured by the first viewing frustum and the second viewing frustum will also be different.

In step S860*a*, the processor 150 uses the projection matrix of the first viewing frustum to generate a right-eye display frame projected on the display plane of the display 130 according to the scene position information. Specifically, the processor 150 may project the three-dimensional grid nodes in the scene image captured by the first viewing frustum onto the display plane of the display 130 to render the right-eye display frame.

In step S860*b*, the processor 150 uses the projection matrix of the second viewing frustum to generate a left-eye display frame projected on the display plane of the display 130 according to the scene position information. Specifically, the processor 150 may project the three-dimensional grid nodes in the scene image captured by the second viewing frustum onto the display plane of the display 130 to render the left-eye display frame.

It should be noted that the processor 150 uses depth estimation technology or depth sensing technology to obtain the scene depth of the three-dimensional grid nodes, and then projects the three-dimensional grid nodes with depth information onto the display plane of the display 130. Therefore, the scene content presented by the display 130 may be more accurate, and the perceived positions of scene objects will not be inappropriately shifted due to lack of depth information.

In step S870, the processor 150 outputs a left-eye display frame and a right-eye display frame through the display 130 to display the scene at the rear side of the display 130. In some embodiments, when the display 130 is a naked-view 3D display, the processor 150 may perform image weaving processing on the left-eye display frame and the right-eye display frame to synchronously and interlacedly display the left-eye display frame and the right-eye display frame. When the display 130 is a glasses-type 3D display, the processor 150 may control the display 130 to alternately display left-eye display frames and right-eye display frames. In this way, the user may feel the stereopsis visual effect.

Based on the above, in embodiments of the invention, user position information and scene position information in the same three-dimensional reference coordinate system may be obtained based on the user image and scene image. The viewing frustum used to determine the display content of the display frame may be based on user position information and the physical size of the display. Therefore, the display scene content of the display frame output by the display may change in response to the user's movement, and may be well aligned with the real scene around the display. In addition, when the scene depth information is used to project the content of the scene image onto the display plane, the scene content presented by the display may be closer to the actual scene.

What is claimed is:

1. A see-through display method, adapted to a see-through display system comprising a first image sensor, a second image sensor and a display, comprising:

capturing a user image toward a front side of the display through the first image sensor, and capturing a scene image toward a rear side of the display through the second image sensor;

obtaining user position information associated with a three-dimensional reference coordinate system according to the user image;

obtaining scene position information associated with the three-dimensional reference coordinate system according to the scene image;

determining a viewing frustum based on the user position information and a physical size of the display;

generating a display frame projected on a display plane of the display according to the scene position information by using a projection matrix of the viewing frustum; and outputting the display frame through the display to display scene at the rear side of the display.

2. The see-through display method according to claim 1, wherein the second image sensor comprises a fisheye lens or a wide-angle lens, and the fisheye lens or the wide-angle lens is configured to capture the scene image, wherein before the step of obtaining the scene position information associated with the three-dimensional reference coordinate system according to the scene image, the method further comprises:

performing a deformation correction process on the scene image.

3. The see-through display method according to claim 1, wherein a first coordinate axis and a second coordinate axis of the three-dimensional reference coordinate system are parallel to the display plane of the display, and an origin point of the three-dimensional reference coordinate system is a reference point on the display plane.

4. The see-through display method according to claim 1, wherein the viewing frustum changes in response to the user position information changes.

5. The see-through display method according to claim 1, wherein the step of obtaining the scene position information associated with the three-dimensional reference coordinate system according to the scene image comprises:

establishing the three-dimensional reference coordinate system based on the display plane of the display;

determining extrinsic parameters of the second image sensor according to a spatial positional relationship between the second image sensor and the display; and performing coordinate conversion to a scene pixel coordinates in the scene image according to internal parameters and the extrinsic parameters of the second image sensor to obtain the scene position information associated with the three-dimensional reference coordinate system.

6. The see-through display method according to claim 1, wherein the user position information comprises a user coordinate associated with the three-dimensional reference coordinate system, and the viewing frustum is obtained by connecting the user coordinates with a plurality of vertices of the display plane.

7. The see-through display method according to claim 1, wherein the scene position information comprises three-dimensional grid scene information associated with the three-dimensional reference coordinate system, and the step of obtaining the scene position information associated with the three-dimensional reference coordinate system according to the scene image comprises:

obtaining depth information corresponding to the scene image; and generating three-dimensional grid scene information associated with the three-dimensional reference coordinate system according to the depth information and the scene image.

8. The see-through display method according to claim 7, wherein the step of obtaining the depth information corresponding to the scene image comprises:

performing an image preprocessing operation on the scene image to generate an adjusted scene image that meets an input requirement of a deep learning model; and obtaining the depth information by analyzing the adjusted scene image through the deep learning model.

9. The see-through display method according to claim 7, wherein the step of obtaining the depth information corresponding to the scene image comprises:

obtaining the depth information corresponding to the scene image by using a depth sensor.

10. The see-through display method according to claim 1, wherein the display comprises a three-dimensional display providing a right-eye display frame and a left-eye display frame, and the step of determining the viewing frustum according to the user position information and the physical size of the display comprises:

determining a first viewing frustum based on right eye position information in the user position information and the physical size of the display; and determining a second viewing frustum based on left eye position information in the user position information and the physical size of the display, wherein the step of generating the display frame projected on the display plane of the display according to the scene position information by using the projection matrix of the viewing frustum comprises:

generating the right-eye display frame projected on the display plane of the display according to the scene position information by using the projection matrix of the first viewing frustum; and generating the left-eye display frame projected on the display plane of the display according to the scene position information by using the projection matrix of the second viewing frustum.

11. A see-through display system comprising:
a first image sensor;
a second image sensor;
a display; and
at least one processor coupled to the first image sensor, the second image sensor and the display, and configured to:
capture a user image toward a front side of the display through the first image sensor, and capturing a scene image toward a rear side of the display through the second image sensor;
obtain user position information associated with a three-dimensional reference coordinate system according to the user image;
obtain scene position information associated with the three-dimensional reference coordinate system according to the scene image;
determine a viewing frustum based on the user position information and a physical size of the display;

generate a display frame projected on a display plane of the display according to the scene position information by using a projection matrix of the viewing frustum; and output the display frame through the display to display scene at the rear side of the display.

12. The see-through display system according to claim 11, wherein the second image sensor comprises a fisheye lens or a wide-angle lens, and the fisheye lens or the wide-angle lens is configured to capture the scene image, and the at least one processor is configured to:

perform a deformation correction process on the scene image.

13. A see-through display system according to claim 11, a first coordinate axis and a second coordinate axis of the three-dimensional reference coordinate system are parallel to the display plane of the display, and an origin point of the three-dimensional reference coordinate system is a reference point on the display plane.

14. The see-through display system according to claim 11, wherein the viewing frustum changes in response to the user position information changes.

15. The see-through display system according to claim 11, wherein the at least one processor is configured to:

establish the three-dimensional reference coordinate system based on the display plane of the display;

determine extrinsic parameters of the second image sensor according to a spatial positional relationship between the second image sensor and the display; and perform coordinate conversion to a scene pixel coordinates in the scene image according to internal parameters and the extrinsic parameters of the second image sensor to obtain the scene position information associated with the three-dimensional reference coordinate system.

16. A see-through display system according to claim 11, wherein the user position information comprises a user coordinate associated with the three-dimensional reference coordinate system, and the viewing frustum is obtained by connecting the user coordinates with a plurality of vertices of the display plane.

17. The see-through display system according to claim 11, wherein the scene position information comprises three-dimensional grid scene information associated with the three-dimensional reference coordinate system, and the at least one processor is configured to:

obtain depth information corresponding to the scene image; and generate three-dimensional grid scene information associated with the three-dimensional reference coordinate system according to the depth information and the scene image.

18. The see-through display system according to claim 17, wherein the at least one processor is configured to:

perform an image preprocessing operation on the scene image to generate an adjusted scene image that meets a input requirement of a deep learning model; and obtain the depth information by analyzing the adjusted scene image through the deep learning model.

19. The see-through display system according to claim 17, further comprising a depth sensor, the at least one processor is connected to the depth sensor and configured to:

obtain the depth information corresponding to the scene image by using a depth sensor.

20. The see-through display system according to claim 11, wherein the display comprises a three-dimensional display providing a right-eye display frame and a left-eye display frame, and the at least one processor is configured to:

determine a first viewing frustum based on right eye position information in the user position information and the physical size of the display; and determine a second viewing frustum based on left eye position information in the user position information and the physical size of the display, wherein the at least one processor is configured to:

generate the right-eye display frame projected on the display plane of the display according to the scene position information by using the projection matrix of the first viewing frustum; and generate the left-eye display frame projected on the display plane of the display according to the scene position information by using the projection matrix of the second viewing frustum.

* * * * *